United States Patent Office 3,246,045
Patented Apr. 12, 1966

3,246,045
METHOD FOR PRODUCING TERMINAL OLEFINS
William D. Hoffman, Park Forest, and Robert M. Eichhorn, Harvey, Ill., assignors to Sinclair Research, Inc., Wilmington, Del., a corporation of Delaware
No Drawing. Filed June 25, 1962, Ser. No. 205,117
4 Claims. (Cl. 260—681)

This invention relates to a method for the production of branched chain terminal olefins. More particularly, the present invention relates to the production of 4-alkyl-1-alkenes and 4,4-dialkyl-1-alkenes.

Since the advent of the Ziegler method for polymerizing terminal olefins, there is a need for a general process for the production of these olefin feedstocks. Although a typical refinery stream contains most of the various isoolefins such as 3-methyl-1-butene and 4-methyl-1-pentene which might be raw materials for these polymers, the concentrations are generally quite low. One possible method for increasing the concentration of the desirable raw materials is isomerization of other isomers to the desired ones. Most of these methods and the catalysts employed for accomplishing this result have suffered from various drawbacks such as lack of selectivity, sensitivity to impurities, etc.

Another method for the production of these terminal olefins is by the dehydration of the corresponding primary alcohols. Heretofore, these methods have proved unsatisfactory in that either low yields are obtained, a poor selectivity to the desired olefin is encountered or the catalyst employed is unstable. Furthermore, primary alcohols such as 4-methyl-1-pentanol, for example, are not readily available.

It has now been discovered that high selective yields of 4-alkyl-1-alkenes or 4,4-dialkyl-1-alkenes can be prepared by dehydration of the corresponding non-tertiary alcohol (i.e., primary or secondary alcohol) having its hydroxy group in the "1" or "2" position in the presence of a particular catalyst, that is, an alumina impregnated with catalytic amounts of the sulfate salt of alkali metals of 11 to 55 atomic number, i.e, Na, K, Rb, and Cs, preferably K. The selection of this catalyst has been found important for the use of other alkali metal-containing catalysts have proved unsatisfactory for one reason or another. For example, alumina impregnated with alkali metal bicarbonate results in a low activity catalyst. A catalyst comprising alumina impregnated with alkali metal halide, although providing good selective yields of the branched chain terminal olefin, is found to be unstable and loses hydrogen chloride in the presence of steam to form a catalyst that provides comparatively low conversion rates.

In accordance with the method of the present invention the feedstock is contacted with the alkali metal sulfate-impregnated alumina catalyst at a temperature of about 600 to 975° F., preferably about 700 to 900° F. The reaction can conveniently be carried out at atmospheric pressure, but superatmospheric pressure can be employed if desired. Weight hourly space velocities (weight of feed per weight of catalyst per hour) of about 0.5 to 20, preferably about 2 to 15 are usually employed. The terminal olefin product can then be recovered from the reaction product mixture by any suitable means known to the art.

The feedstock of the present invention is a branched chain non-tertiary alcohol having the structural formula:

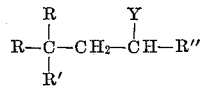

wherein R is a lower alkyl group, for instance, of about 1 to 4 carbon atoms, preferably a methyl group; R' is selected from hydrogen and a lower alkyl group, preferably methyl; Y is selected from hydrogen and hydroxy groups; and when Y is hydrogen R" is a hydroxy methyl group and when Y is an hydroxy group R" is a methyl group. The alcohol normally contains up to about 8 or even 12 or more carbon atoms. Branched chain secondary alcohols are the preferred feedstock of the present invention for two reasons: (1) they are more readily available than the branched chain primary alcohols and (2) the presence of an alkyl-substituent on the carbon atom in a beta position to the hydroxy group provides greater selective yields of the desired terminal olefin than when the alkyl substituent or substituents are on a carbon atom further removed from the hydroxy group of the alcohol. Examples of feedstocks suitable for use in the present invention are 4-methyl-2-pentanol; 4,4-dimethyl-2-pentanol; 4-methyl-1-pentanol; 4-methyl-2-hexanol; 4,4-dimethyl-2-hexanol; 4-ethyl-2-hexanol; 4-methyl-2-heptanol; 4,4-methyl-ethyl-2-pentanol; etc.

As aforementioned the catalyst of the present invention is an alumina catalyst base impregnated with small catalytically effective amouts of $K_2SO_4$. Generally the amount of $K_2SO_4$ deposited on th alumina falls in the range of bout .001 g. to 0.2 g. of $K_2SO_4$ per gram of alumina, preferably about .01 to .08 g./g. of alumina. The alumina can be any of the variety of catalytically active aluminas, for instance, the activated or calcined aluminas of the gamma alumina family, for instance, gamma, eta, chi, etc., aluminas. The most suitable aluminas are those having a high surface area, for instance, at least about 100 m.$^2$/g. The alumina can be calcined prior to impregnation with the metal salt of the present invention and/or after the impregnation. Calcination can be conducted at temperatures known in the art, for example, about 600 to 1300° F. or more. Small amounts of impurities are not generally detrimental. In fact, commercially available Alcoa F–1 alumina which contains up to 0.8 weight percent $Na_2O$ as an impurity is found to be a preferred support for the catalyst of the present invention. Alcoa F–1 alumina is an activated alumina whose typical properties are as follows:

| Chemical analysis | Percent |
|---|---|
| $Al_2O_3$ | 92 |
| $Na_2O$ | 0.80 |
| $Fe_2O_3$ | 0.12 |
| $SiO_2$ | 0.09 |
| Loss on ignition 1100° C. | 6.8 |

Known methods for impregnated the calcined alumina with the $K_2SO_4$ can be employed. A suitable method is to soak the calcined alumina pellets or particles in an aqueous solution of the $K_2SO_4$ and dry and calcine at temperatures above 600° F., e.g., up to 1200 or 1300° F. or more.

The following examples are included to further illustrate the present invention.

Example I

In a Pyrex glass reactor 4-methyl-2-pentanol was dehydrated at a temperature of 800° F. and a weight hourly space velocity of 5.5 employing various catalysts shown in Table I below. Pure nitrogen was used as a diluent at a constant rate of 0.7 cu. ft./hr. The effluent mixture was condensed in a cold water condenser followed by two Dry Ice traps. The gas was passed through a wet test meter and vented. The liquid products, after separation from water were analyzed with gas chromatography. The results are shown in Table I below:

TABLE I

| Run No | 1180-20 | 1108-34 | 1108-23 | 1108-29 | 1108-30 | 1108-61 |
|---|---|---|---|---|---|---|
| Temp., °F | 800 | 800 | 800 | 800 | 800 | 800 |
| Catalyst | Alumina A [1] | Ferric pyro phosphate | F-1 alumina [2] | Alumina A 1% K by KCl [3] | Alumina A 5% K via KCl [3] | F-1 alumina 5% K by $K_2SO_4$ [3] |
| Product analysis: [4] | | | | | | |
| $C_6^-$ | 99.62 | 95.37 | 90.39 | 98.70 | 68.42 | 75.00 |
| NIBK [5] | .38 | 1.99 | 1.60 | .70 | 7.24 | 8.59 |
| Alcohol | | 2.65 | 8.00 | .60 | 24.34 | 16.41 |
| Olefin Split: [4] | | | | | | |
| 4Me-1$C_5^-$ | 23.55 | 26.05 | 36.05 | 36.35 | 40.58 | 42.05 |
| c4Me-2$C_5^-$ | 23.89 | 29.58 | 42.44 | 42.21 | 34.78 | 31.77 |
| t4Me-2$C_5^-$ | 28.33 | 29.14 | 20.93 | 19.35 | 23.19 | 24.29 |
| 2Me-1$C_5^-$ | 7.51 | 5.19 | .22 | .40 | .12 | .93 |
| 2Me-2$C_5^-$ | 13.65 | 9.05 | .36 | 1.54 | 1.20 | .93 |
| 3Me-2$C_5^-$ | 3.07 | .99 | | .15 | .12 | |

[1] Activated alumina made from alumina hydrate predominating in crystalline trihydrate.
[2] Activated alumina containing 0.25% Na.
[3] Formed by impregnating the activated aluminas with aqueous solutions of the potassium salt, drying and calcining at a temperature of 1,000° F.
[4] Chromatographic analysis reported in area percent which is considered as approximately equal to weight percent.
[5] Methyl isobutyl ketone.

The data of Table I demonstrate the superior selective yields of branched chain terminal olefins provided by the $K_2SO_4$ catalyst as compared to the alumina and ferric pyrophosphate catalysts. The KCl-alumina catalyst provided improved yields but was found to be unstable, losing hydrogen chloride in the presence of steam to form a catalyst that provides comparatively low conversion rates.

Example II below is included to demonstrate the instability of KCl on alumina catalysts.

Example II

An activated alumina was impregnated with 5% K as KCl. A portion of this catalyst was subjected to steaming for 4½ hours at about 800° F. Examination of the effluent water from the steaming established that the catalyst was losing HCl. (By way of comparison similar steam treatment of 5% $K_2SO_4$ on alumina for over 100 hours failed to show any evidence of $K_2SO_4$ loss as $SO_2$.) The steaming was continued until the effluent water was free of HCl and the thus treated KCl-alumina catalyst was employed in the dehydration of 4-methyl-2-pentanol under the conditions shown in Table II below. For comparison a run was made employing the virgin or non-steam treated KCl on alumina catalyst. The liquid products were analyzed by gas chromatography. The results are shown in Table II.

TABLE II

| Run No | 1108-30 | 1108-32 |
|---|---|---|
| Catalyst | 5% K on alumina as KCl | 5% K on alumina as KCl (steamed) |
| WHSV | 5.93 | 5.61 |
| Temp. ° F | 800 | 800 |
| Diluent | $N_2$ | $N_2$ |
| Analysis of products: [1] | | |
| Olefin | 68.42 | 15.27 |
| Ketone | 7.24 | 70.41 |
| Alcohol | 24.34 | 14.32 |

[1] Chromatographic analysis reported in area percent.

The data of Table II demonstrates the low conversion rates provided by steam-contacted KCl impregnated alumina catalyst.

Example III

In accordance with the general method of Example I, 4-methyl-2-pentanol was dehydrated by contact with a 5% $K_2SO_4$ on F-1 alumina catalyst at the temperatures shown in Table III below. A WHSV of 4 and a nitrogen dilution of 0.7 cubic feet/hr. were used. The amount of catalyst was 4 grams. The results are also summarized in Table III:

TABLE III

| Run No | 1108-56 | 1108-57 | 1108-58 | 1108-59 | 1108-60 |
|---|---|---|---|---|---|
| Temp., ° F | 635 | 735 | 845 | 925 | 955 |
| Product analysis (area percent): | | | | | |
| Olefin | 10.92 | 62.93 | 92.93 | 91.31 | 89.05 |
| Methyl isobutyl ketone | 1.77 | 3.52 | 5.26 | 7.65 | 10.20 |
| 4-Me-2-pentanol | 87.32 | 33.54 | 1.81 | 1.04 | .77 |
| Olefin split (area percent): | | | | | |
| 4Me-1$C_5^-$ | 40.98 | 38.98 | 40.71 | 40.48 | 47.37 |
| c4Me-2$C_5^-$ | 36.07 | 33.41 | 31.31 | 30.76 | 26.32 |
| t4Me-2$C_5^-$ | 22.95 | 25.06 | 25.05 | 25.91 | 23.68 |
| 2Me-1$C_5^-$ | Trace | 1.39 | 1.57 | 1.42 | 1.31 |
| 2Me-2$C_5^-$ | Trace | 1.16 | 1.37 | 1.42 | 1.31 |

Example IV 4,4-dimethyl-2-pentanol was dehydrated in accordance with the general method of Example I, employing 5% $K_2SO_4$ on F-1 alumina as a catalyst, a temperature of 780° F. and a 4 WHSV. The resulting olefin distribution was as follows:

| | Percent |
|---|---|
| 4,4-dimethyl-1-pentene | 49.4 |
| Cis-4,4-dimethyl-2-pentene | 16.3 |
| Trans-4,4-dimethyl-2-pentene | 34.3 |

Conversion: near quantative.

Example V

Selective yields of 4,4-dimethyl-1-pentene can also be produced by dehydrating 4,4-dimethyl-1-pentanol employing the general method of Example I and a temperature of 980° F., a WHSV of 4 and a 5% $K_2SO_4$ on F-1 alumina catalyst.

We claim:
1. A method for the production of terminal olefins which comprises contacting a feed having the structural formula:

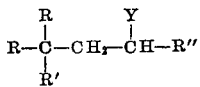

wherein R is a lower alkyl group, R' is selected from the group consisting of hydrogen and a lower alkyl group, Y is selected from the group consisting of hydrogen and hydroxy and when Y is hydrogen R" is hydroxy methyl and when Y is hydroxy R" is methyl, said feed containing up to about 12 carbon atoms with a catalyst consisting essentially of a catalytic amount of alkali metal sulfate having an atomic number of 11 to 55 on alumina under dehydration conditions including a temperature of about 600 to 975° F.

2. The method of claim 1 wherein Y is hydroxy.

3. The method of claim 2 wherein the alkali metal sulfate is potassium sulfate.

4. The method of claim 3 in which the feed is 4,4-dimethyl-2-pentanol.

References Cited by the Examiner

UNITED STATES PATENTS

| 1,002,400 | 9/1911 | Hofmann et al. | 260—681 |
| 2,218,640 | 10/1940 | Friedrichsen | 260—681 |
| 2,468,746 | 5/1949 | Laurent | 260—682 |

FOREIGN PATENTS 583,564  9/1933  Germany.

OTHER REFERENCES

Henne et al., The Dehydration of Secondary and Tertiary Alcohols, Journals of American Chemical Society, vol. 66, 1944, pp. 1649–52 relied on.

ALPHONSO D. SULLIVAN, *Primary Examiner.*